United States Patent [19]

Pernot

[11] Patent Number: 5,507,540
[45] Date of Patent: Apr. 16, 1996

[54] BUMPER WITH MODULAR SHOCK ABSORBER, PARTICULARLY FOR A MOTOR VEHICLE

[75] Inventor: Jean-Marie Pernot, Ordigny au Mont, France

[73] Assignee: Compagnie Plastic Omnium, Lyons, France

[21] Appl. No.: 211,552

[22] PCT Filed: Aug. 6, 1993

[86] PCT No.: PCT/FR93/00796

§ 371 Date: Sep. 29, 1994

§ 102(e) Date: Sep. 29, 1994

[87] PCT Pub. No.: WO94/03347

PCT Pub. Date: Feb. 17, 1994

[30] Foreign Application Priority Data

Aug. 6, 1992 [FR] France ................................. 92 09785

[51] Int. Cl.⁶ ...................................................... B60R 19/18
[52] U.S. Cl. ............................ 293/102; 293/136; 293/120; 267/140

[58] Field of Search ............................. 293/120, 121, 293/136, 102; 267/140

[56] References Cited

U.S. PATENT DOCUMENTS

| 4,925,224 | 5/1990 | Smiszek | 293/120 |
| 5,108,138 | 4/1992 | Kawaguchi | 293/120 |

FOREIGN PATENT DOCUMENTS

| 0170335 | 7/1985 | European Pat. Off. . | |
| 0256174 | 2/1988 | European Pat. Off. . | |
| 180344 | 10/1983 | Japan | 293/120 |
| 118548 | 7/1984 | Japan | 293/121 |
| 59-118548 | 10/1984 | Japan . | |
| 5024491 | 2/1993 | Japan | 293/120 |
| 2197267 | 11/1986 | United Kingdom . | |

Primary Examiner—Dennis H. Pedder
Attorney, Agent, or Firm—Schweitzer Cornman & Gross

[57] ABSTRACT

A bumper is reinforced by a grid of partitions extending from one face thereof with the partitions being adjustable in deformation resistance by further removable interlocking partitions. This enables the bumper strength to be tailored as necessary to each vehicle.

7 Claims, 2 Drawing Sheets

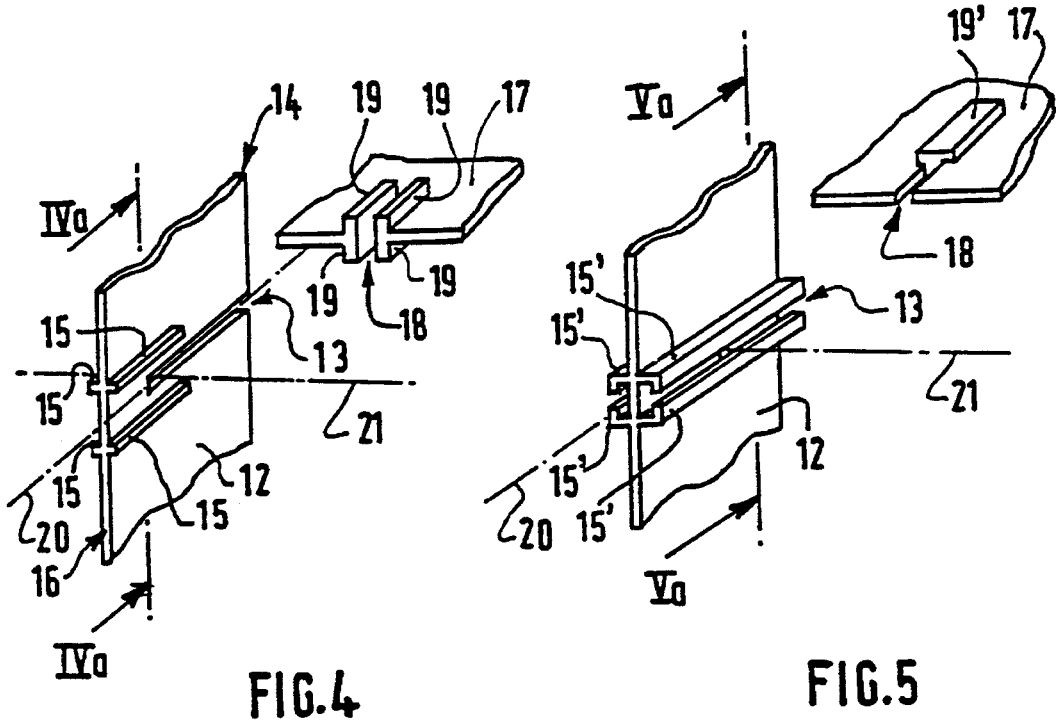
FIG.4    FIG.5
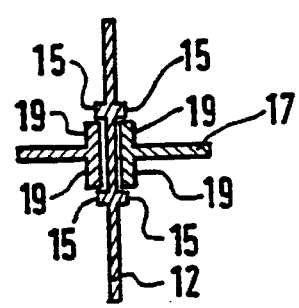    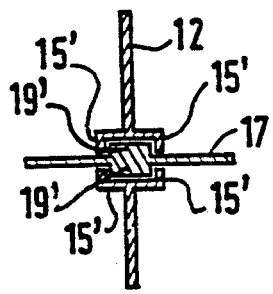
FIG.4a    FIG.5a

BUMPER WITH MODULAR SHOCK ABSORBER, PARTICULARLY FOR A MOTOR VEHICLE

BACKGROUND OF THE INVENTION

The present invention relates to a bumper with modular shock absorber, particularly for a motor vehicle.

Bumpers with built-in shock absorber are already known, of the type in which the shock absorber is either added on, or moulded integrally at the same time as the scuff moulding of the said bumper.

Such shock absorbers described particularly in EP-A-0, 256,174 exhibit the drawback of having mechanical characteristics which are definitively established from the moment of manufacture.

However, the regulations in force as regards road safety require each vehicle to be equipped with a bumper, the mechanical characteristics of which are determined as a function of the weight of the vehicle.

Consequently, depending on whether one and the same model of automobile is in the coupe, saloon or commercial version, it requires a bumper of a particular type, whilst the external form of the scuff moulding remains unchanged.

Furthermore, this problem is accentuated by the fact that the standards differ from one country to another.

SUMMARY OF THE INVENTION

The present invention aims to provide a novel bumper, the impact resistance of which is adaptable depending on the type of use for which it is intended.

Furthermore, a bumper according to the present invention is particularly simple and economic to produce.

The subject of the present invention is a bumper with built-in shock absorber, particularly for a motor vehicle, of the type including, on the one hand, a scuff moulding and, on the other hand, at least one reinforcing element capable of being inserted into the said scuff moulding in order to increase its mechanical strength, characterized in that the scuff moulding is internally equipped with partitions which are parallel to the direction of travel of the vehicle, the said partitions forming a partitioned shock absorber, and that the reinforcing elements consist of additional partitions capable of adding to the partitions already present in the partitioned shock absorber.

According to the invention, a partitioned shock absorber is produced which consists of a plurality of partitions, most of which are parallel to the direction of operation of the said shock absorber, which is, in general, the direction in which the vehicle is travelling.

Advantageously, the additional partitions exhibit a cross-section, for example in the form of an irregular line or sinusoid, which gives them a greater moment of inertia i.e. which gives them greater resistance to deformation.

In a preferred embodiment of the invention, at least one of the additional partitions includes, open on one of its edge sides, a positioning slit, the width of which corresponds substantially to the thickness of a partition of the shock absorber, while the said partition of the shock absorber includes, emerging on its edge side intended to receive the additional partition, a slit, the width of which is close to the thickness of the additional partition.

In this embodiment, the additional partition is inserted into the shock absorber by offering the said additional partition up with its slit facing that of the partition of the shock absorber, these two partitions being substantially perpendicular with respect to each other.

According to a preferred variant, the additional partition is equipped with stiffening ribs in the vicinity of its positioning slit, that partition of the shock absorber which is intended to receive it preferably also including ribs interacting with those of the additional partition when the latter is positioned in the shock absorber, which makes it possible to improve the way in which the two partitions are held in a mutually perpendicular position.

For the purpose of making the invention easier to understand,, an embodiment thereof, given by way of example and with no limiting nature will now be described with reference to the appended drawing in which:

DESCRIPTION OF DRAWINGS

FIG. 4 is a perspective view illustrating the means for assembling reinforcing elements according to a particular embodiment of the invention, FIG. 4a is a sectional view of IVa—IVa of FIG. 4, FIG. 5 is a view similar to FIG. 4 illustrating another embodiment of the invention and, FIG. 5a is a view in section on Va—Va of FIG. 5.

DETAILED DESCRIPTION OF THE INVENTION

Figure 1:
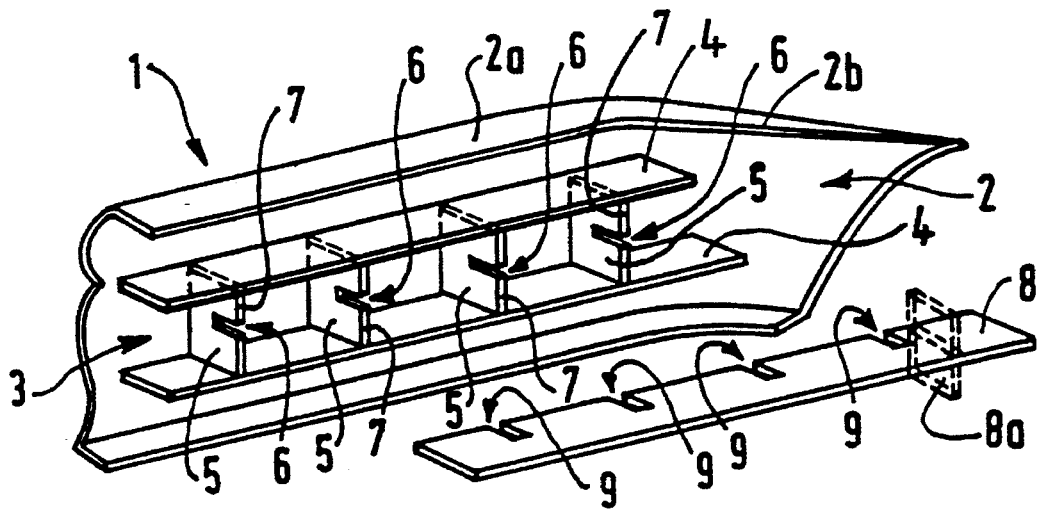
FIG. 1 is a partially cut-away perspective view of a bumper viewed from the inside and of a reinforcing element according to a first embodiment of the invention.

The bumper 1 represented in FIG. 1 consists of a scuff moulding 2 which includes a longitudinal central part 2a and two wrap-round corners 2b at each of the ends of the part 2a. Only the right-hand wrap-round corner is illustrated here. Inside the scuff moulding 2 is housed a shock absorber 3 which results, in the present case, from a single moulding operation with the scuff moulding 2.

The shock absorber 3 illustrated here includes two horizontal partitions 4 located longitudinally with respect to the bumper, between which vertical partitions 5 extend.

Each of the said vertical partitions 5 includes, in its middle part, a horizontal slit 6 which opens out on the edge side 7 of each partition 5.

In accordance with the invention, such a shock absorber 3 is intended to receive a reinforcing element which, in this embodiment, is in the form of a horizontal partition 8, the dimensions of which are substantially identical to those of the two partitions 4.

The partition 8 includes slits 9 which are capable of interacting with the slits 6 of the partitions 5 when the reinforcing element 8 is offered up inside the shock absorber 3 in the position represented.

In the described embodiment, the reinforcing element 8 gives the shock absorber 3 improved mechanical strength designed for heavier vehicles or vehicles with a tighter specification.

For even heavier vehicles, or an even tighter specification, recourse may be had to a stronger reinforcing element 8 which may, for example, include additional partitions extending vertically between its slits 9, such as the partition 8a which is represented in discontinuous lines.

In FIG. 2, a bumper 1 can again be found including a scuff moulding 2 and a shock absorber 3, which both exhibit the same geometry as that of FIG. 1.

In this embodiment, the partitions 5 are left intact and pairs of slits 6' appear on each of the horizontal partitions 4, between the vertical partitions 5.

As before, each of the slits 6' opens out on the short free edge side of the said partitions 4.

Reinforcing elements 8' in the form of additional partitions are intended to be inserted vertically into the shock absorber 3.

Pairs of slits 9' formed on each of the reinforcing elements 8' are capable of interacting with the pairs of slits 6' in the two horizontal partitions 4.

Figure 3:
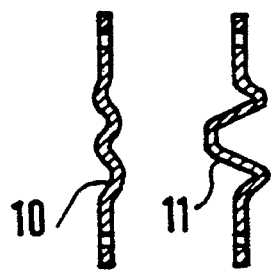
FIG. 3 represents, in section, two variants of the reinforcing elements of FIG. 2.

As in the embodiment described previously, the scuff moulding without the reinforcing elements 8' constitutes an assembly of minimal mechanical strength. Its mechanical strength may be increased as need be, for example, by adding reinforcing elements 8' and possibly by giving these a sinusoidal cross-section 10 or a cross-section in the form of a broken line 11 as represented in FIG. 3.

FIGS. 4 and 5 illustrate embodiments in which reinforcing elements are secured to shock absorber partitions by means of slits reinforced by ribs.

Figure 2:
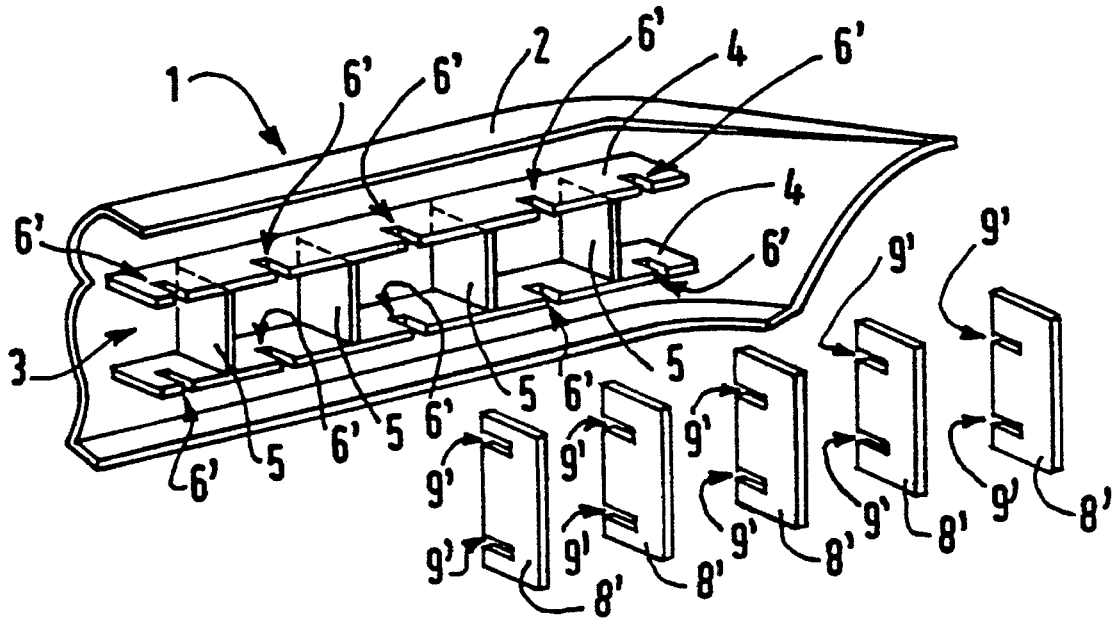
FIG. 2 is a view similar to FIG. 1 of another bumper and of reinforcing elements according to a second embodiment of the invention.

The partition 12 represented in FIG. 4 is a partition of a shock absorber of the type of those represented in FIGS. 1 and 2.

The partition 12 includes a horizontal slit 13 which opens out onto its small edge side 14.

In the embodiment described, the partition 12 also includes two pairs of horizontal ribs 15 situated symmetrically on the two faces of the said partition 12 above and below the slit 13, and extending as far as the small edge side 16 which is in contact with the scuff moulding which is not represented.

A reinforcing element 17, of which only that part which surrounds its positioning slit 18 has been represented here, includes two pairs of reinforcing ribs 19, situated on either side of the said slit 18. These ribs extend perpendicularly to the said reinforcing element over a height equal to the distance which separates the two pairs of slits 15 of the partition 12, being spaced apart by a width close to the thickness of the partition 12.

As is seen most clearly in the sectional view 4a, the ribs 19 trap the partition 12 between the ribs 15, in order to limit the pivoting of the reinforcing plate 17 with respect to the partition 12 about a virtual horizontal axis 20.

Furthermore, by pressing on the ribs 15, the reinforcing ribs 19 also limit the risk of the reinforcing element 17 pivoting with respect to the partition 12 about a second virtual horizontal axis 21.

The embodiment represented in FIG. 5 is a variant in which the plate 12 includes two pairs of horizontal ribs 15', each one L-shaped, which are situated on either side of the slit 13. As is seen in the section 5a, the said ribs 15' between them define a passage of rectangular cross-section open in its middle part.

On the other hand, the reinforcing element 17 includes, in the extension of its slit 18, two excessively thick ribs 19' which give it a rectangular cross-section (FIG. 5a) in its central part.

In the sectional view 5a, the engagement of the said ribs 19' inside the ribs 15' of the partition 12 is clearly seen.

As before, the rotations of the said reinforcing element 17 about the virtual horizontal axes 20 and 21 are greatly limited, by virtue of the ribs 15' and 19'.

It is clearly understood that the embodiments which have just been described exhibit no limiting nature and that they could receive any desirable modifications without thereby departing from the scope of the invention.

In particular, the form of the reinforcing elements described here is particularly simple and could advantageously be made more complicated for the purpose of increasing the moment of inertia of the latter.

The reinforcing elements may, according to the invention, consist of simple elements such as small plates or complicated elements, such as three-dimensional structures, for example honeycomb structures.

Finally, the reinforcing elements according to the invention may be placed on shock absorbers moulded at the same time as the scuff moulding then tipped towards the inside of the latter by virtue of hinges, or may be placed on shock absorbers added into the scuff moulding.

I claim:

1. A vehicle bumper comprising
   (a) a scuff molding of predetermined configuration;
   (b) said scuff molding including a set of integral first horizontal partitions which extend in width parallel to a predetermined direction of travel of the vehicle;
   (c) said scuff molding including a set of integral second vertical partitions which extend in width parallel to said predetermined direction of travel of the vehicle and which are interconnected with the first partitions to form a multi-celled shock absorber;
   (d) rearwardly opening slots formed on one set of said set of vertical and horizontal partitions; and
   (e) at least one supplemental reinforcing element having forwardly opening slots inserted into said rearwardly opening slots of said one set of partitions and interlocking therewith to increase the mechanical strength of the shock absorber.

2. The bumper of claim 1 further characterized in that
   (a) said rearwardly opening slots are formed at intervals on said first horizontal partitions;
   (b) said at least one supplemental reinforcing element is inserted in said rearwardly opening slots;
   (c) each said reinforcing element is parallel to said first vertical partitions.

3. The bumper of claim 1 further characterized in that
   (a) said rearwardly opening slots are formed on each of said second vertical partitions;
   (b) said at least one supplemental reinforcing element is parallel to said first horizontal partitions and is inserted in said rearwardly opening slots.

4. The bumper of claim 1 further characterized in that
   (a) said partitions include first ribs formed adjacent said rearwardly opening slots;
   (b) said at least one reinforcing element includes reinforcing ribs formed adjacent said forwardly opening slots;

(c) said first ribs and said reinforcing ribs being engaged to reinforce said shock absorber.

5. A vehicle bumper according to claim 1, characterized in that:

(a) the at least one supplemental reinforcing element has a cross-section (10, 11) with a higher resistance to deformation than that of the first and second partitions.

6. A vehicle bumper according to claim 1, characterized in that:

(a) said at least one supplemental reinforcing element (17) includes stiffening ribs (19, 19') formed adjacent the forwardly opening slots (18).

7. A vehicle bumper according to claim 6, characterized in that:

(a) said set of second partitions (12) includes ribs (15, 15') interacting with the ribs (19, 19') of the supplemental reinforcing element (17).

* * * * *